Figure 1:
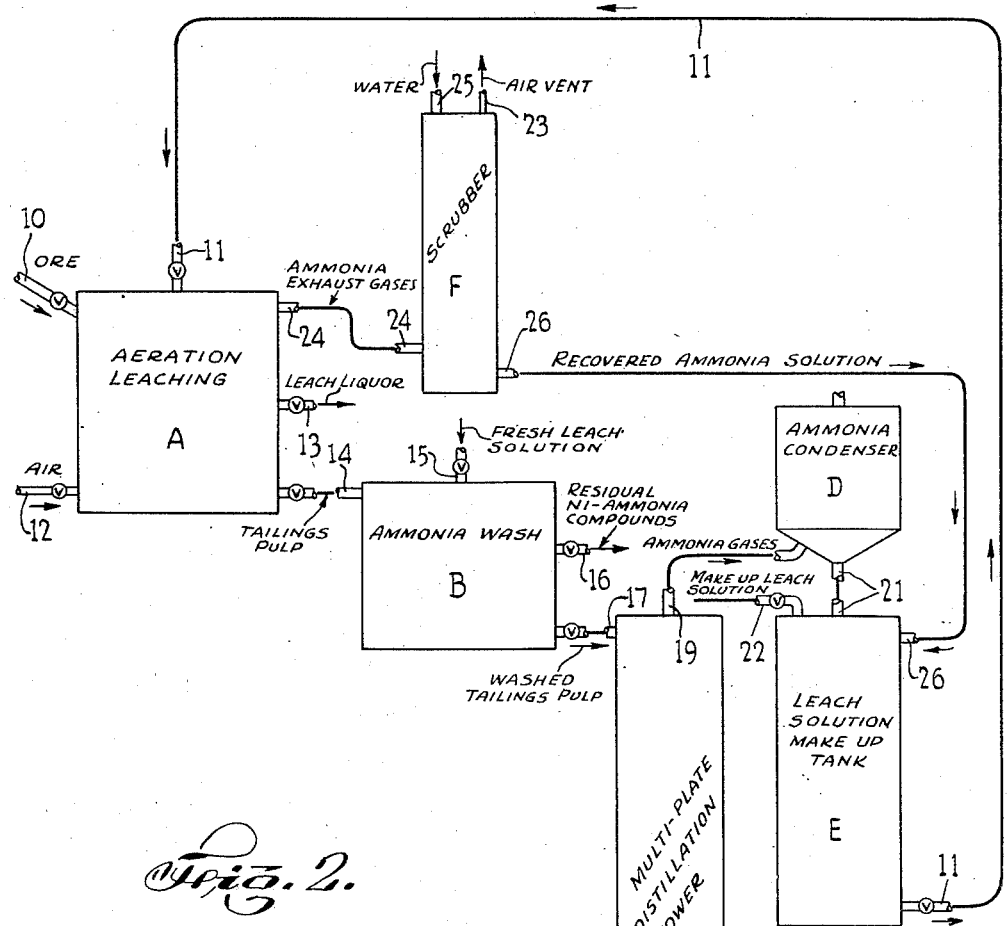
Figure 2:
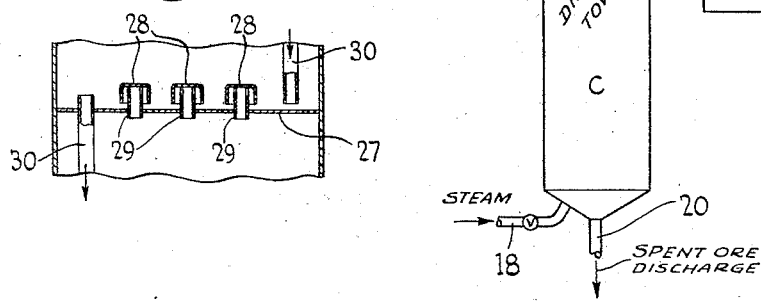

May 14, 1946.   R. C. HILLS   2,400,114
RECOVERY OF NICKEL AND AMMONIA
Filed Dec. 1, 1942

INVENTOR.
ROBERT C. HILLS
BY
Hammond & Littell
ATTORNEYS

Patented May 14, 1946

2,400,114

UNITED STATES PATENT OFFICE 2,400,114

RECOVERY OF NICKEL AND AMMONIA

Robert C. Hills, New York, N. Y., assignor to Nicaro Nickel Company, New York, N. Y., a corporation of Delaware Application December 1, 1942, Serial No. 467,559

7 Claims. (Cl. 75—103)

This invention relates to the extraction of nickel from reduced nickeliferous ores, and more particularly, to the recovery of the nickel content and ammonia from ore tailings obtained by leaching reduced nickeliferous ores with an ammoniacal leaching solution in the presence of oxygen.

It has heretofore been suggested that the nickel content of ores of the nature of garnierite may be extracted by a procedure involving crushing the dried ore to a finely divided state, roasting and cooling it in a reducing atmosphere, leaching out the nickel content with an ammoniacal solution during aeration, and separating the nickel from the leaching solution. This proposed process has many operational advantages over other known methods of nickel recovery from low grade ores, but from an economic standpoint, it presents many difficulties. One of the most serious economic disadvantages is the loss of nickel and ammonia in the leached tailings.

Efforts have been made heretofore to eliminate the loss of these values by washing with water, but by this expedient, only partial recovery is possible both as to the nickel and the ammonia. Furthermore, the amount of water necessary to wash out the ammonium compounds to an economically feasible figure added to that required for the absorption of the ammonia from the exhaust gases used in aerating is so high that if the water solution obtained is treated separately, as by distillation, to concentrate the ammonia to produce a utilizable solution, the amount of steam required for heating is prohibitive, and if the water solution instead is utilized directly in the production of additional leaching solution, a very severe limitation is placed upon the nickel concentration which can be obtained in the leached liquor and also upon the concentration of ammonia which can be employed for leaching.

Investigation of the reasons for only partial recovery of nickel and ammonia from the ore tailings by washing with water has now revealed that the introduction of water (1) causes loss of nickel due to dilution of the ammonia concentration in the leached solution to a point at which the dissolved nickel precipitates out and adheres to the tailings, and (2) results in a loss of ammonia due to adsorption upon the very finely divided ore particles, the amount adsorbed being higher than that theoretically expected.

In accordance with the present invention, the nickel-bearing ammoniacal solution retained in the finely divided ore tailings after completion of the aeration-leaching treatment, is recovered by washing with fresh leaching solution or other ammoniacal solution of a concentration which does not permit the nickel content to precipitate out, whereupon, the tailings pulp, freed of its residual nickel content but still containing ammoniacal solution, is then treated for recovery of ammonia by distilling off the ammonia in a plate tower with the aid of direct steam, baffle-plate, bubble cap plate, and perforated plate towers, for example, being satisfactory. The successful use of plate towers in this operation is surprising in view of the general belief that it is impossible to effect the passage of ore "slimes" through distillation columns, and in view of the fact that prior attempts to recover ammonia from finely divided ore tailings have from a practical standpoint been impossible.

In accordance with a specific illustrative embodiment of the present invention, a reduced nickeliferous oxide ore in finely divided state is leached in several stages with an ammoniacal leaching solution containing 3% ammonia as ammonium carbonate and 3% ammonia as ammonium hydroxide, the said leaching being accompanied by aeration. Upon completion of the leaching operation, substantially all of the insoluble nickel is converted into a soluble form. The ammoniacal solution and its dissolved nickel retained in the ore tailings are then removed by washing with fresh leaching solution of the concentration mentioned, in several stages four of them usually being sufficient.

The tailings pulp containing about an equal amount by weight of the 6% ammonia washing solution is then pumped to the top of a multi-plate distillation tower from which it passes to the bottom of the tower in countercurrent movement to a supply of steam introduced at the bottom of the tower. Concentrated ammonia vapors pass out of the top of the tower and may be condensed and collected by conventional procedure. The pulp of spent ore in water containing not more than about one-half pound of ammonia per ton of ore is discharged to waste from the bottom of the tower.

In order to illustrate the results obtained by the operation of the present invention as compared with the recovery of nickel and ammonia obtained by washing with water in accordance with the prior procedure, the following experimental observations are set out:

| | Total nickel recovery | Ammonia loss in tailings |
|---|---|---|
| | Per cent | Pounds |
| Water washing | 81.9 | 3 to 4 |
| Ammonia washing followed by distillation | 89.6 | 0.5 |

In addition to the increased recovery of nickel and ammonia, the present invention has the additional advantage over the known water-washing process in that the volumes of water used for the preparation of the leaching solutions and for scrubbing the ammonia from the exhaust aeration gases are quite independent variables. The final nickel concentration in the leach liquor and the ammonia concentration for leaching can thus be set at the most efficient point for accomplishing successful leaching. This independence of control and the ability to use larger and completely adequate amounts of water for scrubbing the exhaust gases represent outstanding advantages in the operation of the process of the present invention.

The procedures of the present invention are primarily designed for the recovery of nickel and ammonia in the refining of nickeliferous lateritic ores such as serpentine type minerals and limonite found in Cuba, but such procedures are also applicable to other processes in which metal (as cobalt and copper) is dissolved by leaching from finely divided material by means of ammoniacal solutions.

An apparatus in which the present invention may be carried out is shown in the accompanying drawing in which Figure I is a schematic representation of the whole system and Figure II is a vertical section of a portion of a multi-plate distillation tower included in the apparatus of Figure I.

With reference to Figure I, the finely divided ore to be leached is introduced into the aeration-leaching apparatus A through the inlet 10. The ammonia leaching solution is introduced into the tank A through the inlet conduit 11. With the aid of air introduced through inlet conduit 12, the nickel content of the ore is converted into a soluble compound which after a suitable period is removed in the leach liquor through conduit 13.

The tailings pulp obtained containing residual nickel ammonium compounds and ammonia leach solution may then be transferred through the conduit 14 to an ammonia wash apparatus B into which fresh leach solution in the conduit 15 is run to take up the residual nickel ammonium compounds. This recovered nickel and ammonia is removed through the conduit 16 and the washed tailings pulp is passed through the conduit 17 to the multi-plate distillation tower C.

In this tower C, the remaining part of the of the original ammonia solution and the remaining part of that introduced into the pulp in the washing apparatus B is distilled off. The distillation is accomplished by the countercurrent flow of the tailings pulp with steam introduced into the tower at the bottom through conduit 18. The steam vaporizes the ammonia from the tailings pulp and agitates the pulp on the plates thereby preventing settling out of the solid particles from the liquor. The concentrated ammonia gases rising to the top of the tower C pass out through the conduit 19 to the condenser unit D. The spent ore passes from the tower C through the discharge outlet 20 at the bottom.

From the condenser unit D, the ammonia solution flows through the conduit 21 into the leach solution make-up tank E. Into this tank E, fresh ammonia and ammonium carbonate solution is introduced through the conduit 22 in an amount or concentration to provide the final leach solution desired for use in the aeration-leaching operation in the apparatus A. This leach solution passes from a point near the bottom into the inlet conduit 11 and thence into the aeration-leaching apparatus A. The ammonia exhaust gases from the aeration-leaching apparatus A passes from said apparatus in the conduit 24 into the scrubber F, having an air vent 23, wherein water introduced through conduit 25 takes up the ammonia which is passed to the leaching solution make-up tank E through the conduit 26.

With reference to Figure II showing an enlarged section of the tower C, there is illustrated a single plate 27 having three bubble caps 28 mounted over uptake pipes 29. The pulp flows onto the plates through overflow pipes 30.

It should be understood that the tower construction is only illustrative of the invention and that other constructions may be employed, the only requirement being that the arrangement of parts be such that the steam can serve its function of vaporizing the ammonia during passage of the pulp in countercurrent thereto and that the pulp be agitated by the steam to prevent the settling out of the particles on the plates.

It should be understood that the present invention is not limited to the specific materials, proportions, procedure and equipment herein disclosed but that it extends to all equivalents which will occur to those skilled in the art upon consideration of the following claims.

I claim:

1. A method of recovering residual nickel ammonium compounds and ammonia from reduced nickeliferous silicate ore tailings pulp obtained by leaching said ore with ammoniacal leaching solution during aeration which comprises washing out the nickel ammonium compounds with an ammoniacal solution and gravity flowing the washed ore tailings pulp countercurrent to and in intimate contact with steam in a series of superimposed bodies wherein steam and resulting vapors bubble through the pulp, ammonia is vaporized and steam is condensed in said bodies and whereby concentrated ammonia gases are obtained above the top body of tailings, and ore tailings slurry substantially freed of ammonia is obtained as the bottom body.

2. A method of treating reduced nickeliferous silicate ore tailings pulp after leaching with an ammoniacal leach solution which comprises recovering the residual nickel and ammonia combined therewith by washing the ore tailings pulp with ammoniacal leach solution in which the nickel ammonium compounds are soluble, and distilling off the ammonia remaining in said pulp by gravity flowing the pulp downwardly to form a series of superimposed bodies of said pulp, introducing steam into the bottom body of pulp, bubbling the steam uncondensed in the pulp together with vaporized ammonia through each successively higher body of pulps, and condensing the concentrated ammonia gases leaving the top body of pulp.

3. The process of recovering nickel and ammonia from residual nickel-containing ammoniacal leaching solutions contained in pulp tailings obtained by leaching reduced nickeliferous ores with an ammoniacal solution during aeration, which comprises separating the nickel-containing solution from the pulp tailings by washing with fresh ammoniacal leaching solution and separating the residual ammonia from the ammoniacal solution in the pulp tailings by distilling off the ammonia in a multi-plate tower holding superimposed bodies of said pulp with the aid of direct steam bubbled successively through the plates of the tower in a direction countercurrent to the pulp tailings flowing by force of gravity through said plates, whereby progressively more concentrated vapors of ammonia are given off from the bodies as the distillation continues and concentrated ammonia vapors leave the top body.

4. A method of recovering the residual nickel content and ammonia from spent nickeliferous ore tailings leached with an ammoniacal solution which comprises separating from the tailings the nickel content dissolved in the residual ammoniacal leach solution by washing with ammoniacal leaching solution, and recovering the residual ammonia in the resulting tailings pulp by distillation aided by direct steam during passage of the pulp by gravity flow through a series of superimposed bodies of a pulp in a multi-plate bubble cap distillation tower in a countercurrent direction to direct steam bubbled successively through said bodies, whereby progressively more concentrated vapors of ammonia are given off from the bodies as the distillation continues and concentrated ammonia vapors leave the top body.

5. A method of treating reduced nickeliferous silicate ore tailings pulp for the recovery of residual nickel ammonium compounds and ammonia which pulp has been obtained by the leaching of a nickeliferous silicate ore with an ammoniacal leach solution during aeration which comprises recovering the residual nickel ammonium compounds by washing the ore tailings pulp with ammoniacal leach solution in which the nickel ammonium compounds are soluble and distilling off the ammonia remaining in said pulp by gravity flowing the pulp downwardly through a multi-plate bubble cap distillation tower countercurrent to steam introduced into the bottom of the tower and bubbled successively through the bodies of pulp on the plates, removing from the top of the tower the concentrated ammonia vapors obtained at the top of the tower and from the bottom of the tower the ore tailings slurry substantially freed of ammonia obtained at the bottom of the tower.

6. The process of recovering ammonia from ammoniacal leaching solutions contained in pulp tailings obtained by leaching reduced nickeliferous ores with an ammoniacal solution during aeration, which comprises distilling off the ammonia in said pulp by gravity flowing the same downwardly to form a series of superimposed bodies of said pulp, introducing steam into the bottom body of pulp, bubbling the steam uncondensed in the pulp together with vaporized ammonia through each successively higher body of pulp and collecting the concentrated ammonia gases leaving the top body of pulp.

7. The process of recovering ammonia from ammoniacal leaching solutions contained in pulp tailings obtained by leaching reduced nickeliferous ores with an ammoniacal solution during aeration, which comprises distilling off the ammonia in said pulp by gravity flowing the same downwardly through a multi-plate bubble cap distillation tower to form a series of superimposed bodies of said pulp, bubbling the steam uncondensed in the pulp together with vaporized ammonia through each successively higher body of pulp and collecting the concentrated ammonia gases leaving the top body of pulp.

ROBERT C. HILLS.